US012615620B2

(12) United States Patent
Hong

(10) Patent No.: US 12,615,620 B2
(45) Date of Patent: Apr. 28, 2026

(54) PAGING METHOD AND APPARATUS, AND COMMUNICATION DEVICE

(71) Applicant: Beijing Xiaomi Mobile Software Co., Ltd., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 462 days.

(21) Appl. No.: 18/546,732

(22) PCT Filed: Feb. 24, 2021

(86) PCT No.: PCT/CN2021/077727
§ 371 (c)(1),
(2) Date: Aug. 16, 2023

(87) PCT Pub. No.: WO2022/178727
PCT Pub. Date: Sep. 1, 2022

(65) Prior Publication Data
US 2024/0147426 A1 May 2, 2024

(51) Int. Cl.
*H04W 68/02* (2009.01)
*H04W 12/0431* (2021.01)
*H04W 12/106* (2021.01)

(52) U.S. Cl.
CPC ....... *H04W 68/02* (2013.01); *H04W 12/0431* (2021.01); *H04W 12/106* (2021.01)

(58) Field of Classification Search
CPC .............. H04W 68/02; H04W 12/106; H04W 12/0431
See application file for complete search history.

(56) References Cited

U.S. PATENT DOCUMENTS

| | | | |
|---|---|---|---|
| 2009/0215473 A1 | 8/2009 | Hsu | |
| 2019/0393969 A1 | 12/2019 | Kim | |
| 2020/0305118 A1 | 9/2020 | Ryu et al. | |
| 2022/0116909 A1* | 4/2022 | Jung | H04W 74/0833 |
| 2022/0191824 A1* | 6/2022 | Kumar | H04W 68/02 |
| 2023/0018140 A1* | 1/2023 | Catovic | H04W 68/02 |

(Continued)

FOREIGN PATENT DOCUMENTS

| | | |
|---|---|---|
| CN | 102244919 A | 11/2011 |
| CN | 102264067 A | 11/2011 |

(Continued)

OTHER PUBLICATIONS

"KI#2: Update Solution #3 Busy Indication," Proceedings of the SA WG2 Meeting #136AH, Sony, S2-2000838, Jan. 13, 2020, Incheon, South Korea, 4 pages.

(Continued)

*Primary Examiner* — Margaret G Webb
(74) *Attorney, Agent, or Firm* — McCoy Russell LLP

(57) ABSTRACT

A paging method includes: receiving, by a terminal device, a busy token forwarded by an access network device; receiving by a terminal device, a paging request from a non-currently-connected system forwarded by the access network device; generating, by a terminal device, a first message according to the busy token; and sending, by a terminal device, the first message to a core network device via the access network device.

20 Claims, 10 Drawing Sheets

(56)        References Cited

U.S. PATENT DOCUMENTS

| | | | | |
|---|---|---|---|---|
| 2023/0262655 A1* | 8/2023 | Li | .......................... | H04W 68/02 |
| | | | | 455/458 |
| 2023/0328688 A1* | 10/2023 | Kumar | ................. | H04W 60/00 |
| | | | | 455/458 |
| 2023/0354265 A1* | 11/2023 | Yamamoto | ............ | H04W 68/02 |
| 2024/0073994 A1* | 2/2024 | Zhang | ................... | H04W 76/18 |

FOREIGN PATENT DOCUMENTS

| | | | |
|---|---|---|---|
| CN | 102984801 A | 3/2013 |
| CN | 103314624 A | 9/2013 |
| CN | 104254983 A | 12/2014 |
| CN | 110178431 A | 8/2019 |
| CN | 110692263 A | 1/2020 |
| CN | 111630933 A | 9/2020 |
| CN | 112218370 A | 1/2021 |
| WO | 2018138006 A1 | 8/2018 |
| WO | 2019184859 A1 | 10/2019 |
| WO | 2020209620 A1 | 10/2020 |

OTHER PUBLICATIONS

"KI #2, New Sol: Enabling a UE to receive paging message from another network," Proceedings of the SA WG2 Meeting #141E, Samsung, S2-2007534, Oct. 12, 2020, Electronic, Elbonia, 6 pages.

"UE Notification on Network Switching for Multi-SIM," Proceedings of the 3GPP TSG-RAN WG2 Meeting #113 electronic, OPPO, R2-2100245, Jan. 25, 2021, Online, 3 pages.

"Secure Busy Indication by MU SIM UE," Proceedings of the 3GPP TSG-SA3 Meeting #102-e, Nokia, Nokia Shanghai Bell, S3-210147, Jan. 18, 2021, E-Meeting, 4 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300, V14.13.0, Dec. 2020, 28 pages.

"Solution KI#1: Busy Indication as a paging response," Proceedings of the SA WG2 Meeting #136, Sony, S2-1912408, Revision of S2-1911141, Nov. 18, 2019, Reno, Nevada, 5 pages.

* cited by examiner

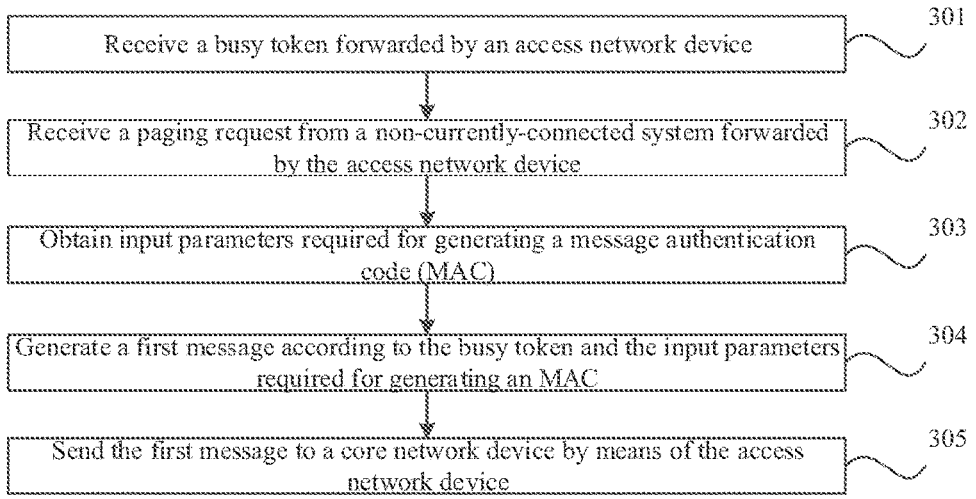

| Receive a busy token forwarded by an access network device | 301 |

| Receive a paging request from a non-currently-connected system forwarded by the access network device | 302 |

| Obtain input parameters required for generating a message authentication code (MAC) | 303 |

| Generate a first message according to the busy token and the input parameters required for generating an MAC | 304 |

| Send the first message to a core network device by means of the access network device | 305 |

Fig. 4

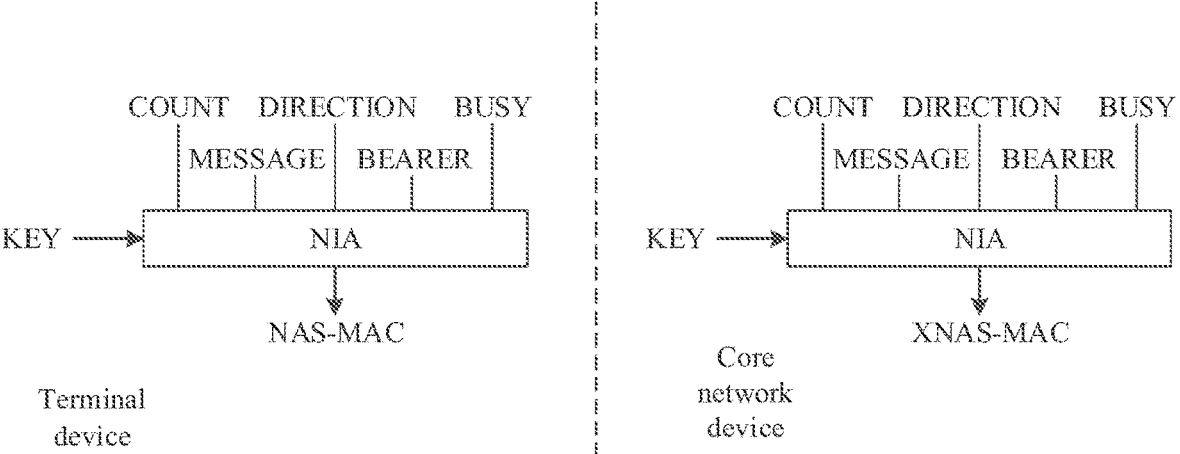

Fig. 5

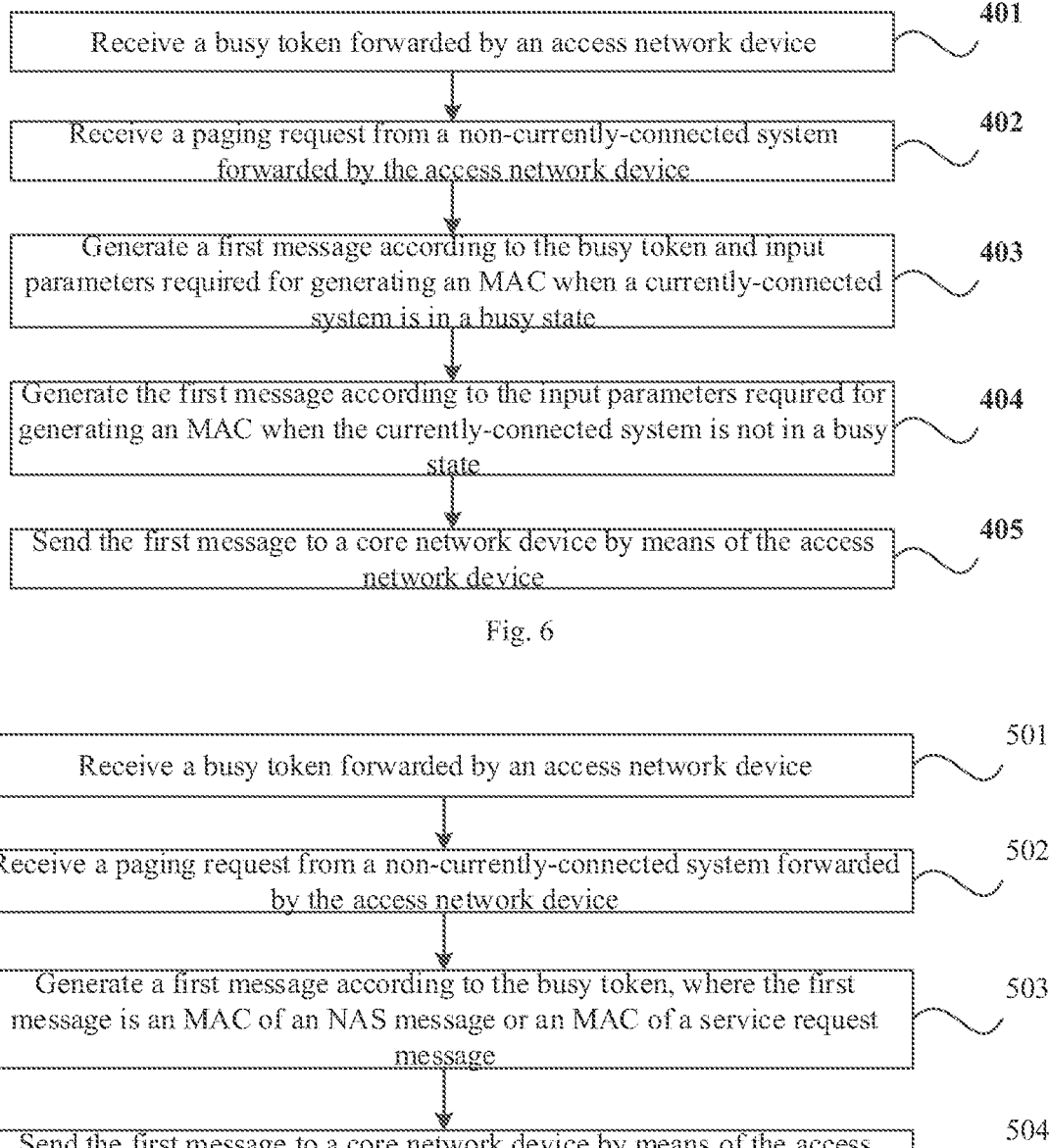

Receive a busy token forwarded by an access network device                          401

Receive a paging request from a non-currently-connected system forwarded by the access network device                          402

Generate a first message according to the busy token and input parameters required for generating an MAC when a currently-connected system is in a busy state                          403

Generate the first message according to the input parameters required for generating an MAC when the currently-connected system is not in a busy state                          404

Send the first message to a core network device by means of the access network device                          405

Fig. 6

Receive a busy token forwarded by an access network device                          501

Receive a paging request from a non-currently-connected system forwarded by the access network device                          502

Generate a first message according to the busy token, where the first message is an MAC of an NAS message or an MAC of a service request message                          503

Send the first message to a core network device by means of the access network device                          504

Fig. 7

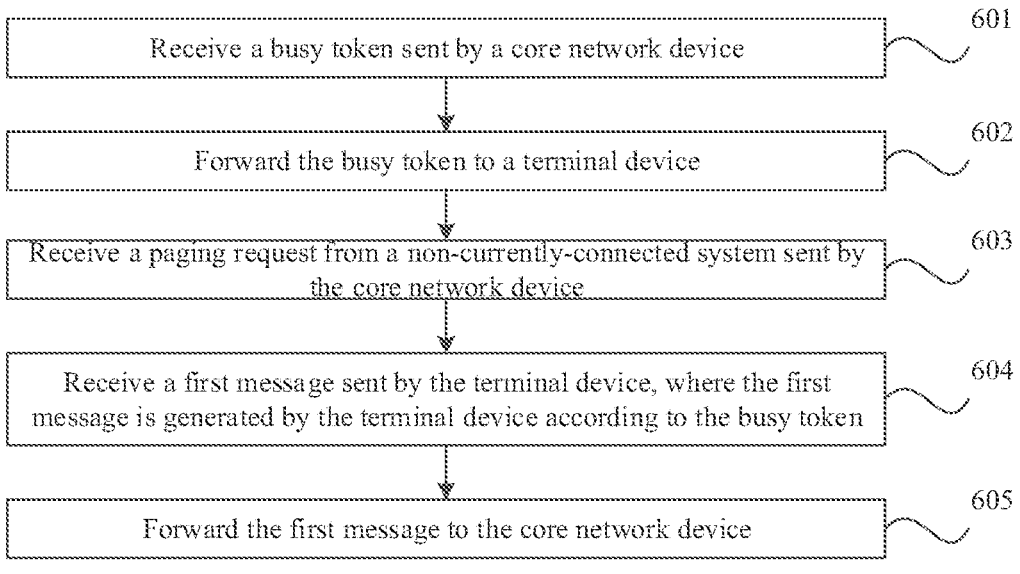

601 Receive a busy token sent by a core network device

602 Forward the busy token to a terminal device

603 Receive a paging request from a non-currently-connected system sent by the core network device 604 Receive a first message sent by the terminal device, where the first message is generated by the terminal device according to the busy token 605 Forward the first message to the core network device

Fig. 10

701 Send a busy token to a terminal device by means of an access network device

702 Send a paging message to the terminal device by means of the access network device 703 Receive a first message forwarded by the access network device, where the first message is generated by the terminal device according to the busy token 704 Parse the first message according to the busy token

Fig. 11

PAGING METHOD AND APPARATUS, AND COMMUNICATION DEVICE

CROSS REFERENCE TO RELATED APPLICATION

The present application is a U.S. National Phase of International Application No. PCT/CN2021/077727 entitled "PAGING METHOD AND APPARATUS, AND COMMUNICATION DEVICE," and filed on Feb. 24, 2021. The entire contents of the above-listed application are hereby incorporated by reference for all purposes.

TECHNICAL FIELD

The disclosure relates to the technical field of radio communication, and in particular relates to a paging method and a paging apparatus, and a communication device.

BACKGROUND

In the 3rd generation partnership project (3GPP) radio access technology (RAT), a terminal device having a number of universal subscriber identity modules (USIMs) and the associated USIMs can be concurrently registered. When the terminal device having a number of USIMs communicates with a system associated with one of the USIMs (the system is referred to as a currently-connected system), the terminal device having a number of USIMs may be required to perform some activities of listening to paging, responding to paging, performing a mobility update, and the like in another system associated with a USIM different from the USIM mentioned above, and this system mentioned above is referred to as a non-currently-connected system.

SUMMARY

An example in a first aspect of the disclosure provides a paging method, including: receiving, by a terminal device, a busy token forwarded by an access network device; receiving, by the terminal device, a paging request from a non-currently-connected system forwarded by the access network device; generating, by the terminal device, a first message according to the busy token; and sending, by the terminal device, the first message to a core network device via the access network device; where the terminal device has a first USIM and a second USIM, the terminal device communicates with a currently-connected system through the first USIM, and the terminal device communicates with the non-currently-connected system through the second USIM.

An example in a second aspect of the disclosure provides another paging method, including: receiving, by an access network device, a busy token sent by a core network device; forwarding, by the access network device, the busy token to a terminal device; receiving, by the access network device, a paging request from a non-currently-connected system sent by the core network device; forwarding, by the access network device, the paging request from the non-currently-connected system to the terminal device; receiving, by the access network device, a first message sent by the terminal device, where the first message is generated by the terminal device according to the busy token; and forwarding, by the access network device, the first message to the core network device; where the terminal device has a first USIM and a second USIM, the terminal device communicates with a currently-connected system through the first USIM, and the terminal device communicates with the non-currently-connected system through the second USIM.

An example in a third aspect of the disclosure provides another paging method, including: sending, by a core network device, a busy token to a terminal device via an access network device; sending, by the core network device, a paging message to the terminal device via the access network device; receiving, by the core network device, a first message forwarded by the access network device, where the first message is generated by the terminal device according to the busy token; and parsing, by the core network device, the first message according to the busy token; where the terminal device has a first USIM and a second USIM, the terminal device communicates with a currently-connected system through the first USIM, and the terminal device communicates with the non-currently-connected system through the second USIM.

An example in a fourth aspect of the disclosure provides a communication device, including: a transceiver; a memory; and a processor connected to the transceiver and the memory respectively, configured to control wireless signal transceiving of the transceiver by executing a computer-executable instruction on the memory, and capable of performing the paging method provided in the example in the first aspect of the disclosure.

An example in an fifth aspect of the disclosure provides another communication device, including: a transceiver; a memory; and a processor connected to the transceiver and the memory respectively, configured to control wireless signal transceiving of the transceiver by executing a computer-executable instruction on the memory, and capable of performing the paging method provided in the example in the second aspect of the disclosure.

An example in a sixth aspect of the disclosure provides another communication device, including: a transceiver; a memory; and a processor connected to the transceiver and the memory separately, configured to control wireless signal transceiving of the transceiver by executing a computer-executable instruction on the memory, and capable of performing the paging method provided in the example in the third aspect of the disclosure.

Advantages and additional aspects of the disclosure will partially be set forth in the following description, will partially become apparent from the following description, or will be learned by practice of the disclosure.

BRIEF DESCRIPTION OF THE DRAWINGS

The foregoing and/or additional aspects and advantages of the disclosure will become apparent and readily appreciated from the following description of the examples in conjunction with the accompanying drawings.

FIG. 4 is a schematic flowchart of another paging method according to an example of the disclosure.

FIG. 5 is a schematic diagram of input parameters and output results of an integrity algorithm (NIA) according to an example of the disclosure;

FIG. 6 is a schematic flowchart of another paging method according to an example of the disclosure.

FIG. 7 is a schematic flowchart of another paging method according to an example of the disclosure.

FIG. 10 is a schematic flowchart of another paging method according to an example of the disclosure.

FIG. 11 is a schematic flowchart of another paging method according to an example of the disclosure.

DETAILED DESCRIPTION

Figure 1:
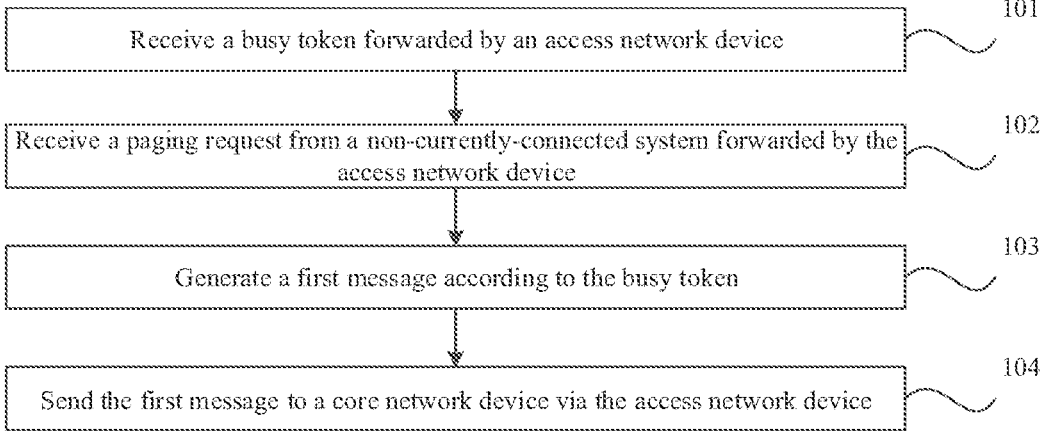
FIG. 1 is a schematic flowchart of a paging method according to an example of the disclosure.

Description will be made in detail to examples here, instances of which are illustrated in the accompanying drawings. When the following description relates to the accompanying drawings, the same numbers in different accompanying drawings refer to the same or similar elements unless otherwise indicated. Embodiments described in the following examples do not represent all embodiments consistent with examples of the disclosure. On the contrary, they are instances of apparatuses and methods consistent with some aspects of the examples of the disclosure as described in detail in the appended claims.

The term used in the examples of the disclosure is for the purpose of describing particular examples and is not intended to limit the examples of the disclosure. As used in the examples and the appended claims of the disclosure, singular forms "a" "an" and "the" are intended to include plural forms as well, unless otherwise clearly indicated in the context. It should be understood that the term "and/or" as used here refers to and encompasses any or all possible combinations of one or more of the associated listed items.

It should be understood that although the terms first, second, third, and the like may be employed in the examples of the disclosure to describe various information, such information should not be limited to these terms. These terms are merely used to distinguish the same type of information from each other. For instance, first information may also be referred to as second information, and similarly, second information may also be referred to as first information, without departing from the scope of the examples of the disclosure. The word "if" as used here may be construed to mean "at the time of" or "when" or "in response to determining", depending on the context.

Examples of the disclosure are described in detail below, and instances of the examples are illustrated in the drawings, in which the same or similar reference numerals refer to the same or similar elements. The examples described below by reference to the drawings are illustrative to explain the disclosure and are not to be construed as limiting the disclosure.

The disclosure relates to the technical field of radio communication, and in particular relates to a paging method and a paging apparatus, and a communication device.

When the terminal device having a number of USIMs receives paging from the non-currently-connected system for notification of a mobile terminated (MT) service to be received, the terminal device having a number of USIMs may send a busy indication to a network side in the presence of a running service in the currently-connected system. The terminal device having a number of USIMs carries the busy indication in a specific non-access stratum (NAS) message.

However, the above way of carrying a busy indication in a specific NAS message requires changes to the existing NAS message, and the busy indication also needs to be bound to the specific NAS message, which is less applicable and less flexible.

When a terminal device having a plurality of USIM (USIMs) receives paging from a non-currently-connected system for notification of a mobile terminated (MT) service to be received and if the terminal device having a plurality of USIMs determines that the MT service is less important than a running service and prefers to continue to maintain the running service in a currently-connected system, the following two cases are possible.

In the first case, the terminal device having a plurality of USIMs responds to the paging from the non-currently-connected system according to an existing process, but the above manner of responding to the paging will interrupt the running service in the currently-connected system.

In the second case, the terminal device having a plurality of USIMs does not respond to the paging from the non-currently-connected system. In this way, the non-currently-connected system will maintain paging of the terminal device having a plurality of USIMs by expanding a paging range to a larger area, thus causing resources of the non-currently-connected system to be wasted.

Thus, how to handle an MT service for a terminal device having a plurality of USIMs while avoiding any unnecessary interruption of a running service in a currently-connected system becomes a problem to be solved.

The 3rd generation partnership project (3GPP) TR 23.761 protocol proposes a solution to solve the above problems as follows: a terminal device having a plurality of USIMs is allowed to send a busy indication as a response to paging by a non-currently-connected system, such that the non-currently-connected system stops paging according to the busy indication, so as to save system resources, and moreover, a running service in the currently-connected system is not interrupted.

However, regarding security of the above busy indication, if the busy indication is not protected during transmission, the busy indication may be eavesdropped, modified, replayed or even forged by an attacker. Such a threat misleads a network side into operating in a manner unexpected by the terminal device having a plurality of USIMs, which causes a denial of service (DOS) attack on the terminal device and the network side. A proposed solution to this problem in the 3GPP TR 33.873 protocol is as follows: an existing non-access stratum (NAS) signaling security mechanism is reused to protect the busy indication carried in the NAS message. A specific NAS message carrying a busy indication is not defined, and a proposal to indicate a busy state through a service request has been discussed.

A main problem of using a service request to indicate a busy state is that according to an existing process, the service request is actually a positive response to the paging. Sending a service request by the terminal device means that after a service request process, the terminal device accepts the paging and transitions from an idle state to a connected state, which means that the terminal device will terminate a running service and run on a new service paging it. In short, using a service request to indicate a busy state will cause indication of a busy state to fail unless the existing service request process is changed, that is, the current service request process is changed to stop a subsequent step when a busy indication exists in the request.

Currently, solution #1 of the TR 33.837 protocol is as follows: a security solution of the NAS signaling is used to protect the busy indication. Assuming that a terminal device having a plurality of USIMs may periodically suspend radio resource control (RRC) connection through a USIM-1 (UE-1), it is allowed that the terminal device having a plurality of USIMs executes paging monitoring through a USIM-2 (UE-2). The UE-1 is in a connected mode, and the UE-2 is in an idle mode. An access and mobility management function (AMF)-2 serving the UE-2 sends a paging request message to a base station-2, and the request message is configured to page the UE-2. After receiving a paging message, the UE-2 responds with a NAS message carrying a new cause value "BUSY" after a Random Access Channel (RACH) procedure if the UE-2 decides to send a busy indication. A radio access network (RAN)-2 forwards the NAS message to the AMF-2.

The busy indication in the NAS message is needed to be encrypted. An encryption mechanism defined in section 6.4.4 of the TS 33.501 protocol may be reused to protect the busy indication in the NAS message. Moreover, integrity protection is performed on the busy indication in the NAS message. An integrity protection mechanism defined in section 6.4.3 of the TS 33.501 protocol may be reused to protect integrity of the busy indication in the NAS message.

However, the above solution is based on the assumption that an existing NAS message can carry a busy indication. Reusing the existing NAS security in 4G or 5G has the following main unsolved problems.

1. Currently, unless specifications of involved messages are updated, the existing NAS messages cannot carry a busy indication.

2. According to a current standardization procedure, a first NAS message sent by the terminal device after paging is a "service request", which switch the UE-2 into a connected mode and interrupt a service running on the UE-1. If the service request is configured to carry a busy indication, not only a message format needs to be updated, but the entire process needs to be updated to stop subsequent steps when a busy indication exists in the request.

3. The terminal device and the AMF must support NAS signaling encryption, but an operator is not mandatory to use NAS signaling encryption. The operator may configure the AMF to activate NAS signaling encryption or to deactivate the NAS signaling encryption, such that it may still happen that the NAS message is not encrypted and the busy indication is sent in a clear text, which results in invalid encryption of the busy indication in the NAS message in the solution above.

In view of the above problems, the disclosure provides a paging method and a paging apparatus and a communication device.

FIG. 1 is a schematic flowchart of a paging method according to an example of the disclosure. The paging method may be applied to a terminal device.

The terminal device may be a device that provides speech and/or data connectivity to a user, a handheld device with a radio connection function, or other processing devices connected to a radio modem, and the like In different systems, names of the terminal devices may be different. For instance, in a 5G system, the terminal devices may be referred to as user equipment (UE). A radio terminal device may communicate with one or more core networks (CNs) through a radio access network (RAN). The radio terminal device may be a mobile terminal device, such as a mobile phone (or called a "cellular" phone) and a computer having a mobile terminal device, for instance, a portable, pocket-sized, hand-held, computer-built or vehicle-mounted mobile device, which exchanges language and/or data with the RAN.

For instance, the terminal device may be a personal communication service (PCS) phone, a cordless phone, a session initiated protocol (SIP) phone, a wireless local loop (WLL) station, a personal digital assistant (PDA), and the like. The radio terminal device may also be referred to as a system, a subscriber unit, a subscriber station, a mobile station, a mobile, a remote station, an access point, a remote terminal, an access terminal, a user terminal, a user agent, and a user device, which is not limited in the examples of the disclosure.

As shown in FIG. 1, the paging method may include: step 101, step 102, step 103 and step 104.

In step 101, a busy token forwarded by an access network device is received.

With the access network device being a base station as an example, the base station may include a plurality of cells serving the terminal device. Depending on specific applications, each cell may include a plurality of transmitting receiving points (TRPs), or may be a device in an access network that communicates with a radio terminal device over an air interface via one or more sectors, or other names. For instance, the base station involved in the example of the disclosure may be a base transceiver station (BTS) in a global system for mobile communications (GSM) or in a code division multiple access (CDMA), a NodeB in a wide-band code division multiple access (WCDMA), possibly an evolutional Node B (eNB or e-NodeB for short) in a long term evolution (LTE) system, a 5G base station (gNB for short) in a 5G network architecture (next generation system), a home evolved Node B (HeNB), a relay node, a femto, a pico, and the like, which is not limited in the examples of the disclosure.

In the example of the disclosure, the busy token is forwarded by a core network device to the terminal device via the access network device.

In step 102, a paging request forwarded by the access network device from a non-currently-connected system is received.

The terminal device has a first USIM and a second USIM, the terminal device communicates with a currently-connected system through the first USIM, and the terminal device communicates with the non-currently-connected system through the second USIM.

In the example of the disclosure, the currently-connected system is a system corresponding to a network currently accessed by the terminal device, and the system and the terminal device are in a connected mode. The non-currently-connected system is a system corresponding to a network not currently accessed by the terminal device, and the system and the terminal device are in an idle mode. In order to distinguish different USIMs in the terminal device, in the disclosure, a USIM in the terminal device that communicates with the currently-connected system may be referred to as a first USIM, and a USIM in the terminal device that communicates with the non-currently-connected system may be referred to as a second USIM.

For instance, the terminal device has two USIMs, and the two USIMs are a mobile USIM and a telecommunication USIM respectively. Assuming that the terminal device communicates with other terminal devices through the mobile USIM, the currently-connected system may be a system corresponding to a mobile network, and the non-currently-connected system may be a system corresponding to a telecommunication network. For another instance, the terminal device has two USIMs, and both of the USIMs are mobile USIMs. The currently-connected system may be a system 1 corresponding to the mobile network, and the non-currently-connected system may be a system 2 corresponding to the mobile network, that is, the system 1 and the system 2 are both systems corresponding to the mobile network.

In the example of the disclosure, the terminal device may use the second USIM to receive a paging request from the non-currently-connected system forwarded by the access network device. The paging request is configured to page the terminal device.

Alternatively, the core network device of the non-currently-connected system may send the paging request to the terminal device via the access network device. Correspondingly, the terminal device may use the second USIM to receive the paging request forwarded by the access network device from the core network device of the non-currently-connected system.

In step 103, a first message is generated according to the busy token.

In the example of the disclosure, after the terminal device receives the paging request, the terminal device may determine whether the currently-connected system is in a busy state. In the case that the currently-connected system is in the busy state, the terminal device may generate the first message according to the busy token. The first message is configured to indicate the busy state of the terminal device.

In step 104, the first message is sent to a core network device via the access network device.

In the example of the disclosure, the terminal device may use the second USIM to send the first message to the core network device of the non-currently-connected system via the access network device, such that the core network device may determine whether the terminal device is in the busy state according to the first message, and may stop paging the terminal device when it is determined that the terminal device is in the busy state, so as to reduce resource occupation.

According to the paging method provided in the example of the disclosure, the terminal device generates the first message according to the busy token, and sends the first message to the core network device via the access network device, such that the core network device can be timely informed whether the terminal device is in a busy state according to the first message. Since it is unnecessary to carry a busy indication in a specific NAS message, there is no need to change an existing NAS message or bind the busy indication to the specific NAS message, and applicability and flexibility of the method can be improved.

It should be noted that the foregoing possible embodiments may be executed separately or may be executed in combination, which is not limited in the examples of the disclosure.

Figure 2:
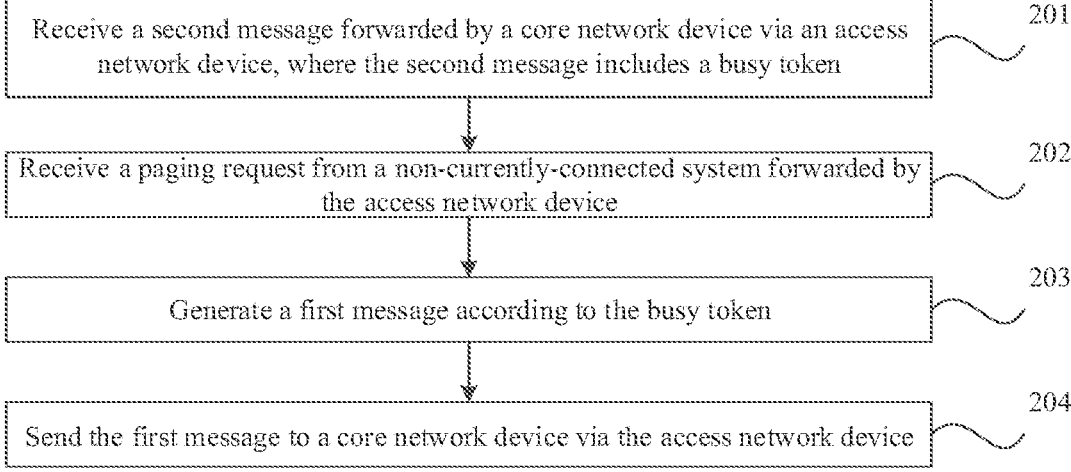
FIG. 2 is a schematic flowchart of another paging method according to an example of the disclosure.

An example of the disclosure provides another paging method. FIG. 2 is a schematic flowchart of another paging method according to an example of the disclosure. The paging method may be applied to a terminal device. The paging method may be executed separately, may also be executed in combination with any example of the disclosure or a possible embodiment in the examples, and may also be executed in combination with any technical solution in the related art.

As shown in FIG. 2, the paging method may include: step 201, step 202, step 203 and step 204.

In step 201, a second message forwarded by a core network device via an access network device is received, where the second message includes a busy token.

In the example of the disclosure, the second message is generated by the core network device of the non-currently-connected system and sent to the terminal device via the access network device. The second message includes the busy token. Correspondingly, the terminal device may use the second USIM to receive the second message sent by the core network device via the access network device.

Alternatively, the core network device may be an AMF. The AMF of the non-currently-connected system may send the second message to the terminal device via the access network device. Correspondingly, the terminal device may use the second USIM to receive the second message sent by the AMF of the non-currently-connected system via the access network device, such that the terminal device may obtain the busy token from the second message.

In a possible embodiment of the example of the disclosure, the second message may be an NAS security mode command (SMC) message.

In a possible embodiment of the example of the disclosure, in order to prevent the second message from being modified and guarantee the integrity of the second message, the core network device may perform integrity protection on the second message. Correspondingly, after receiving the second message, the terminal device may perform integrity authentication on the second message.

In step 202, a paging request forwarded by the access network device from a non-currently-connected system is received.

The terminal device has a first USIM and a second USIM, the terminal device communicates with a currently-connected system through the first USIM, and the terminal device communicates with the non-currently-connected system through the second USIM.

In step 203, a first message is generated according to the busy token.

In step 204, the first message is sent to the core network device via the access network device.

Steps 202-204 may be implemented in any manner of the examples of the disclosure respectively, which is not limited by the examples of the disclosure and will not be repeated here.

Figure 3:
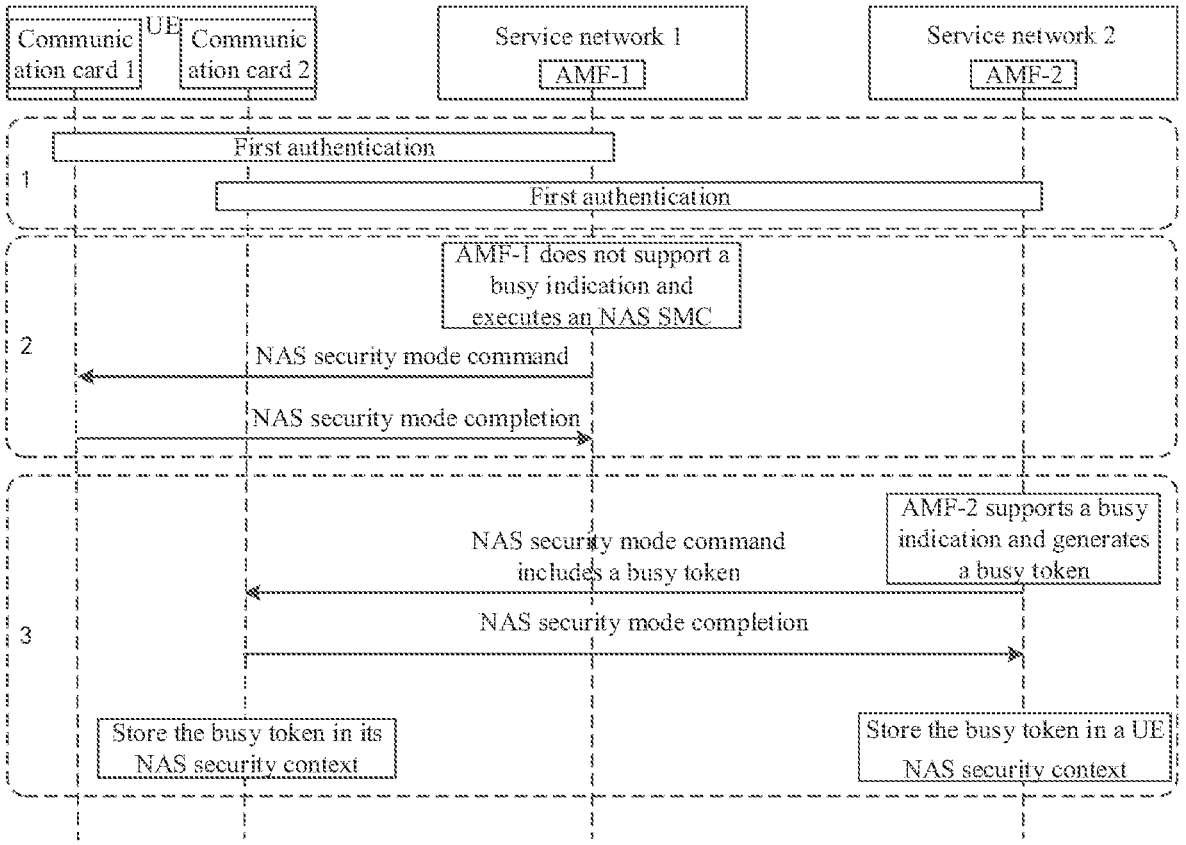
FIG. 3 is a schematic flowchart of generating and configuring a busy token according to an example of the disclosure.

As an instance, the terminal device is an UE. The UE has two USIMs, that is, a USIM 1 and a USIM 2. As shown in FIG. 3, a process of generating and configuring the busy token may include the following three parts: part 1, part 2 and part 3.

In part 1: when the UE registers to a home network, the UE uses the USIM 1 to execute first authentication to the home network through a serving network 1, and uses the USIM 2 to execute first authentication (defined in the TS 33.501 protocol) to the home network through a serving network 2. During the first authentication, a capability to support a plurality of USIMs is exchanged between the UE using the USIM 1 and an AMF-1 serving the USIM 1, and between the UE using the USIM 2 and an AMF-2 serving the USIM 2.

In part 2: since the AMF-1 does not support a multi-USIM function, an NAS SMC procedure may be executed between the AMF-1 and the UE as currently defined in the TS 33.501 protocol, and then an NAS security context is established between the AMF-1 and the UE.

In part 3: since the AMF-2 supports a multi-USIM function, the AMF-2 may generate the busy token for the UE, generate an NAS SMC message according to the busy token, and send the NAS SMC message to the UE via the access network device (not shown in FIG. 3). The busy token is stored at the UE and the AMF-2, as part of the NAS security context. The AMF-2 activates NAS integrity protection before sending the NAS SMC message, such that integrity protection is performed on the busy token.

According to the paging method provided in the example of the disclosure, the terminal device generates the first message according to the busy token, and sends the first message to the core network device via the access network device, such that the core network device can be timely informed whether the terminal device is in a busy state according to the first message. Since it is unnecessary to carry a busy indication in a specific NAS message, there is no need to change an existing NAS message or bind the busy indication to the specific NAS message, and applicability and flexibility of the method can be improved.

It should be noted that the foregoing possible embodiments may be executed separately or may be executed in combination, which is not limited in the examples of the disclosure.

An example of the disclosure provides another paging method. FIG. 4 is a schematic flowchart of another paging method according to an example of the disclosure. The paging method may be applied to a terminal device. The paging method may be executed separately, may also be executed in combination with any example of the disclosure or a possible embodiment in the examples, and may also be executed in combination with any technical solution in the related art.

As shown in FIG. 4, the paging method may include: step 301, step 302, step 303, step 304 and step 305.

In step 301, a busy token forwarded by an access network device is received.

In step 302, a paging request forwarded by the access network device from a non-currently-connected system is received.

The terminal device has a first USIM and a second USIM. The terminal device communicates with a currently-connected system through the first USIM, and the terminal device communicates with a non-currently-connected system through the second USIM.

Steps 301-302 may be implemented in any manner of the examples of the disclosure separately, which is not limited by the examples of the disclosure and will not be repeated here.

In step 303, input parameters required for generating a message authentication code (MAC) is obtained.

In a possible embodiment of the example of the disclosure, the input parameters required for generating a message authentication code (MAC) may include message content, an integrity key, a count value, a bearer identifier, and transmission direction information. For instance, in the protocol TS 33.501 D.3.1.1, the input parameters required for an MAC may include a 128-bit NAS integrity key named KEY ($K_{NASint}$), a 32-bit COUNT, a 5-bit BEARER for bearing an identity, a 1-bit transmission direction information (DIRECTION). For an uplink, DIRECTION is 0. For a downlink, DIRECTION is 1.

In step 304, a first message is generated according to the busy token and the input parameters required for generating an MAC.

In the example of the disclosure, the terminal device may generate the first message according to the busy token and the input parameters required for generating an MAC.

In a possible embodiment of the example of the disclosure, the terminal device may perform integrity protection on the message content, the count value, the bearer identifier, the transmission direction information, and the busy token according to the integrity key, and generate the first message, in order to avoid tampering of the busy token and guarantee the integrity of the busy token.

Alternatively, according to the protocol TS 33.501 D.3.1.1, input parameters of an integrity algorithm (NIA) include a 128-bit NAS integrity key named KEY ($K_{NASint}$), a 32-bit COUNT, a 5-bit BEARER for bearing an identity, a 1-bit transmission direction information (DIRECTION), and message content (MESSAGE). For instance, with reference to FIG. 5, BUSY refers to a busy token. The busy token is an additional input parameter for computing an MAC. The terminal device may compute a 32-bit MAC through the integrity algorithm (NIA), to generate the first message. For instance, the generated MAC may be the NAS-MAC in FIG. 5.

In step 305, the first message is sent to the core network device via the access network device.

In the example of the disclosure, the terminal device may use the second USIM to send the first message to the core network device of the non-currently-connected system via the access network device. Correspondingly, after receiving the first message, the core network device may use the busy token to perform integrity authentication on the first message. If the integrity authentication succeeds, it is determined that the terminal device is not in the busy state, and in this case, the core network device may page the terminal device. If the integrity authentication fails, it is determined that the terminal device is in the busy state, and in this case, in order to reduce resource occupation, the core network device may stop paging the terminal device.

In a possible embodiment of the example of the disclosure, the core network device may extract a first MAC from the first message. The first MAC is an MAC generated by the terminal device according to the busy token and the input parameters required for generating an MAC through the integrity algorithm, that is, an MAC is generated by the terminal device by performing integrity protection on the message content, the count value, the bearer identifier, transmission direction information and the busy token according to the integrity key. For instance, the first MAC may be an NAS-MAC in FIG. 5. Moreover, the core network device may obtain the input parameters required for generating an MAC, and then generate a second MAC according to the busy token and the input parameters required for generating an MAC. For instance, the second MAC may be the XNAS-MAC in FIG. 5, such that the core network device may determine a busy state of the terminal device according to a match between the first MAC and the second MAC.

Alternatively, in the case that the first MAC is consistent with the second MAC, the core network device may determine that the terminal device is in the busy state. In the case that the first MAC is inconsistent with the second MAC, the core network device may determine that the terminal device is not in the busy state.

According to the paging method provided in the example of the disclosure, the terminal device generates the first message according to the busy token, and sends the first message to the core network device via the access network device, such that the core network device can be timely informed whether the terminal device is in a busy state according to the first message. Since it is unnecessary to carry a busy indication in a specific NAS message, there is no need to change an existing NAS message or bind the busy indication to the specific NAS message, and applicability and flexibility of the method can be improved.

It should be noted that the foregoing possible embodiments may be executed separately or may be executed in combination, which is not limited in the examples of the disclosure.

An example of the disclosure provides another paging method. FIG. 6 is a schematic flowchart of another paging method according to an example of the disclosure. The paging method may be applied to a terminal device. The paging method may be executed separately, may also be executed in combination with any example of the disclosure or a possible embodiment in the examples, and may also be executed in combination with any technical solution in the related art.

As shown in FIG. 6, the paging method may include: step 401, step 402, step 403, step 404 and step 405.

In step 401, a busy token forwarded by an access network device is received.

In step 402, a paging request forwarded by the access network device from a non-currently-connected system is received.

The terminal device has a first USIM and a second USIM, the terminal device communicates with a currently-connected system through the first USIM, and the terminal device communicates with a non-currently-connected system through the second USIM.

Steps 401-402 may be implemented in any manner of the examples of the disclosure separately, which is not limited by the examples of the disclosure and will not be repeated here.

In step 403, when a currently-connected system is in a busy state, a first message is generated according to the busy token and input parameters required for generating an MAC.

It should be noted that explanation of the input parameters required for generating an MAC and generation of the first message according to the busy token and the input parameters required for generating an MAC in the above examples is also applicable to this example, which will not be repeated here.

In the example of the disclosure, the terminal device may determine whether the currently-connected system is in the busy state. When the currently-connected system is in the busy state, in order to make the core network of the non-currently-connected system informed of the busy state of the terminal device in time, the terminal device may generate the first message according to the busy token and parameters required for generating an MAC.

In step 404, when the currently-connected system is not in a busy state, the first message is generated according to the input parameters required for generating an MAC.

In the example of the disclosure, when the currently-connected system is not in the busy state, the terminal device may respond to a paging request from the non-currently-connected system. In this case, the terminal device does not need to generate the first message according to busy signaling. Thus, the terminal device may generate the first message according to the input parameters required for generating an MAC.

In step 405, the first message is sent to a core network device through the access network device.

In the example of the disclosure, step 405 may be implemented in any manner of the examples of the disclosure, which is not limited by the examples of the disclosure and will not be repeated here.

According to the paging method provided in the example of the disclosure, the terminal device generates the first message according to the busy token, and sends the first message to the core network device via the access network device, such that the core network device can be timely informed whether the terminal device is in a busy state according to the first message. Since it is unnecessary to carry a busy indication in a specific NAS message, there is no need to change an existing NAS message or bind the busy indication to the specific NAS message, and applicability and flexibility of the method can be improved.

It should be noted that the foregoing possible embodiments may be executed separately or may be executed in combination, which is not limited in the examples of the disclosure.

An example of the disclosure provides another paging method. FIG. 7 is a schematic flowchart of another paging method according to an example of the disclosure. The paging method may be applied to a terminal device. The paging method may be executed separately, may also be executed in combination with any example of the disclosure or a possible embodiment in the examples, and may also be executed in combination with any technical solution in the related art.

As shown in FIG. 7, the paging method may include: step 501, step 502, step 503 and step 504.

In step 501, a busy token forwarded by an access network device is received.

In step 502, a paging request forwarded by the access network device from a non-currently-connected system is received.

The terminal device has a first USIM and a second USIM. The terminal device communicates with a currently-connected system through the first USIM, and the terminal device communicates with a non-currently-connected system through the second USIM.

Steps 501-502 may be implemented in any manner of the examples of the disclosure separately, which is not limited by the examples of the disclosure and will not be repeated here.

In step 503, a first message according to the busy token is generated, where the first message is an MAC of an NAS message or an MAC of a service request message.

It should be noted that an explanation of a first message generation process in the foregoing examples is also applicable to this example, which will not be repeated here. The first message may be an MAC of the NAS message, and alternatively, the first message may also be an MAC of a service request message, which is not limited in the disclosure.

That is, in the example of the disclosure, there are two ways to use the busy token. One way is to use the busy token on a new to-be-defined short NAS message, and the other way is to use the busy token on an existing service request message.

Figure 8:
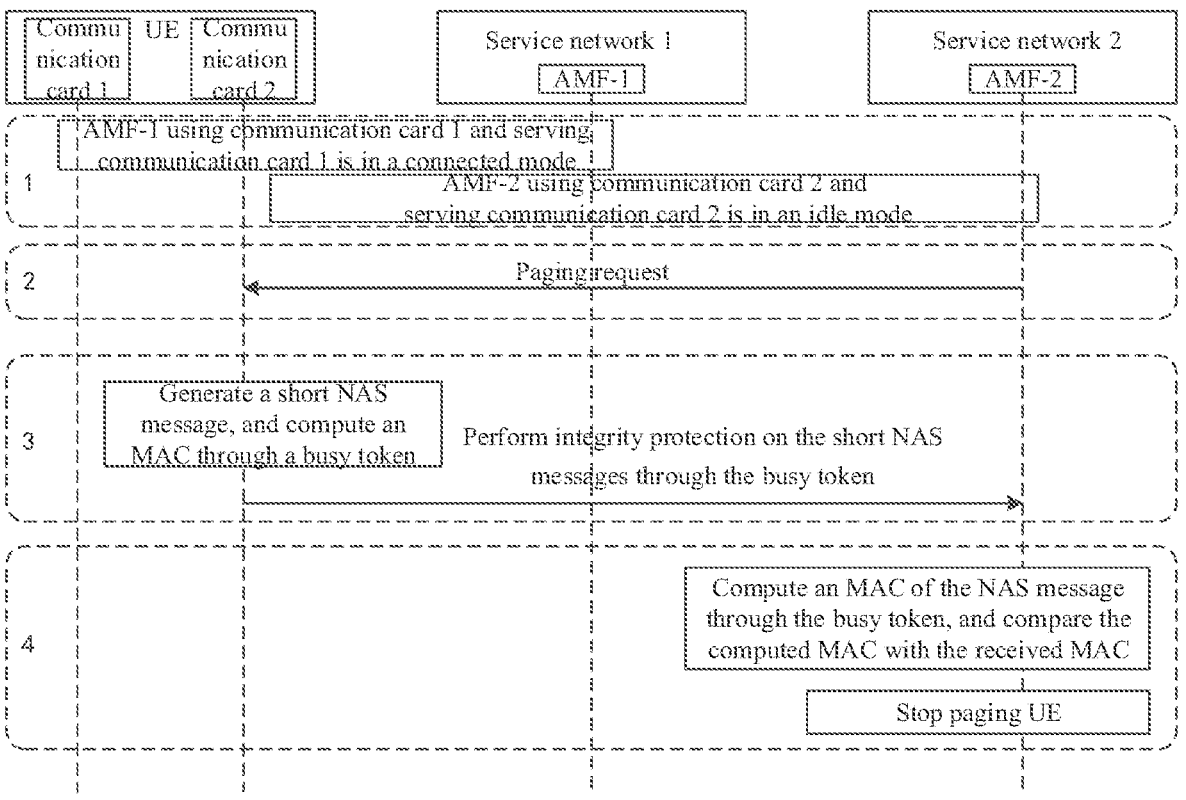
FIG. 8 is a schematic flowchart of using a busy token on a new to-be-defined short non-access stratum (NAS) message in an example of the disclosure.

As an instance, a process of using the busy token on a new to-be-defined short NAS message may be as shown in FIG. 8. In FIG. 8, the terminal device is an UE. The UE has two USIMs, that is, a USIM (USIM) 1 and a USIM (USIM) 2. The UE uses the USIM 1 to be in a connected mode with an AMF-1 serving the USIM 1. The UE uses the USIM 2 to be in an idle mode with an AMF-2 serving the USIM 2 (corresponding to part 1 in FIG. 8). The AMF-2 sends the paging request to the UE via the access network device (not shown in FIG. 8) (corresponding to part 2 in FIG. 8).

The UE generates a short NAS message having necessary information. The necessary information includes a UE temporary identifier (for instance, 5G Globally Unique Temporary UE Identity (5G-GUTI) or 5G-S-TMSI (5G-S-TMSI is a shortened form of 5G-GUTI)) for identification of the AMF-2. Integrity of the short NAS message is then protected as follows: the MAC is computed using the stored busy token as an additional input parameter. The short NAS message subject to integrity protection is sent to the AMF-2 via the access network device (corresponding to part 3 in FIG. 8).

When the AMF-2 performs paging and receives a response from the UE, the AMF-2 retrieves the busy token stored in a UE NAS security context and computes the MAC of the received short NAS message through the same input parameters as those used by the UE. For instance, after the UE computes the 32-bit MAC through the integrity algorithm (NIA), the 32-bit MAC may be appended to the short NAS message. After receiving the short NAS message, the AMF-2 computes the MAC of the short NAS message according to the busy token through the same algorithm as the UE, and performs integrity authentication, that is, determines whether the computed MAC matches the MAC in the received NAS message. If the integrity authentication succeeds, that is, the computed MAC matches the MAC in the received NAS message, the AMF-2 stops paging the UE, and the received NAS message is determined to be a valid message indicating a busy state (corresponding to part 4 in FIG. 8).

It should be noted that the AMF-2 can use the busy token after sending the paging request, but not before. After sending the paging request, the AMF-2 always uses the busy token to authenticate the first NAS message from the UE. If the AMF-2 fails to authenticate the NAS message using the busy token, the AMF-2 authenticates the received NAS message using a normal UE NAS security context (that is, without using the busy token as an input parameter).

Figure 9:
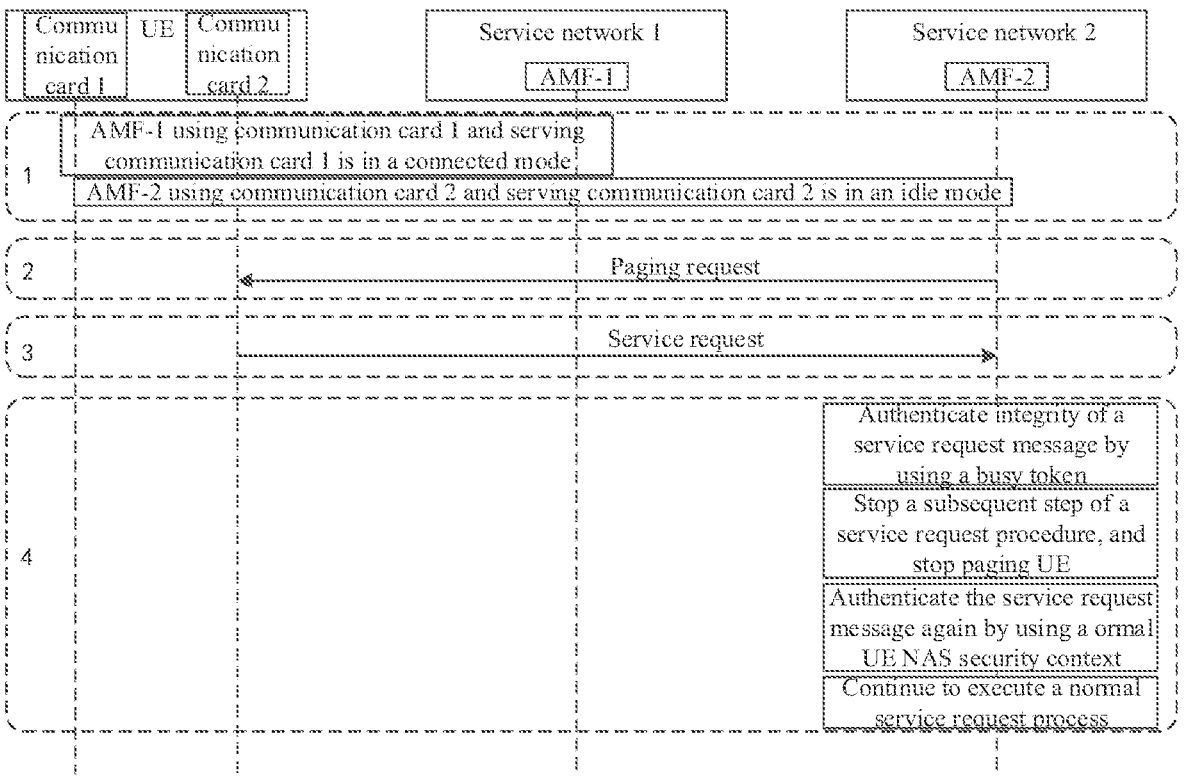
FIG. 9 is a schematic flowchart of using a busy token on an existing service request message according to an example of the disclosure.

As another instance, a process of using the busy token on an existing service request message may be as shown in FIG. 9. In FIG. 9, the terminal device is an UE. The UE has two USIMs, that is, a USIM (USIM) 1 and a USIM (USIM) 2. The UE uses the USIM 1 to be in a connected mode with an AMF-1 serving the USIM 1. The UE uses the USIM 2 to be in an idle mode with an AMF-2 serving the USIM 2 (corresponding to part 1 in FIG. 9). The AMF-2 sends the paging request to the UE via the access network device (not shown in FIG. 9) (corresponding to part 2 in FIG. 9).

The UE responds to the paging through the service request message, performs integrity protection on the service request message, and uses the USIM 2 to send the service request message subject to integrity protection to the AMF-2 via the access network device (corresponding to part 3 in FIG. 9).

When the AMF-2 performs paging and receives the service request message from the UE, the AMF-2 retrieves the busy token stored in the UE NAS security context and computes an MAC of the received service request message. If the computed MAC matches the MAC in the received service request message, the integrity authentication succeeds, and the AMF-2 stops paging the UE. If the integrity authentication fails, the AMF-2 authenticates the service request message again using the normal UE NAS security context. If the second integrity authentication succeeds, the AMF-2 continues to execute a normal service request process defined in the protocol TS 23.502 (corresponding to part 4 in FIG. 9).

In step 504, the first message is sent to a core network device via the access network device.

In the example of the disclosure, step 504 may be implemented in any manner of the examples of the disclosure, which is not limited by the examples of the disclosure and will not be repeated here.

According to the paging method provided in the example of the disclosure, the terminal device generates the first message according to the busy token, and sends the first message to the core network device via the access network device, such that the core network device can be timely informed whether the terminal device is in a busy state according to the first message. Since it is unnecessary to carry a busy indication in a specific NAS message, there is no need to change an existing NAS message or bind the busy indication to the specific NAS message, and applicability and flexibility of the method can be improved.

It should be noted that the foregoing possible embodiments may be executed separately or may be executed in combination, which is not limited in the examples of the disclosure.

An example of the disclosure provides another paging method. FIG. 10 is a schematic flowchart of another paging method according to an example of the disclosure. The paging method may be applied to an access network device.

As shown in FIG. 10, the paging method may include: step 601, step 602, step 603, step 604 and step 605.

In step 601, a busy token sent by a core network device is received.

In step 602, the busy token is forwarded to a terminal device.

The terminal device has a first USIM and a second USIM, the terminal device communicates with a currently-connected system through the first USIM, and the terminal device communicates with a non-currently-connected system through the second USIM.

In step 603, a paging request from a non-currently-connected system sent by the core network device is received.

In step 604, a first message sent by the terminal device is received, where the first message is generated by the terminal device according to the busy token.

In step 605, the first message is forwarded to the core network device.

In a possible embodiment of the example of the disclosure, the first message is an MAC of an NAS message or an MAC of a service request message.

In a possible embodiment of the example of the disclosure, the step of receiving, by an access network device, a busy token sent by a core network device may include: receive, by the access network device, a second message sent by the core network device, where the second message includes the busy token.

In a possible embodiment of the example of the disclosure, the second message is an NAS SMC message.

It should be noted that an explanation of the paging method executed on the terminal device in any one of the foregoing examples in FIGS. 1-7 is also applicable to the paging method executed on the access network device in this example, and an implementation principle is similar, which will not be repeated here.

According to the paging method provided in the example of the disclosure, the terminal device generates the first message according to the busy token, and sends the first message to the core network device via the access network device, such that the core network device can be timely informed whether the terminal device is in a busy state according to the first message. Since it is unnecessary to carry a busy indication in a specific NAS message, there is no need to change an existing NAS message or bind the busy indication to the specific NAS message, and applicability and flexibility of the method can be improved.

It should be noted that the foregoing possible embodiments may be executed separately or may be executed in combination, which is not limited in the examples of the disclosure.

An example of the disclosure provides another paging method. FIG. 11 is a schematic flowchart of another paging method according to an example of the disclosure. The paging method may be applied to a core network device.

As shown in FIG. 11, the paging method may include: step 701, step 702, step 703 and step 704.

In step 701, a busy token is sent to a terminal device via an access network device.

The terminal device has a first USIM and a second USIM, the terminal device communicates with a currently-connected system through the first USIM, and the terminal device communicates with a non-currently-connected system through the second USIM.

In step 702, a paging message is sent to the terminal device via the access network device.

In step 703, a first message forwarded by the access network device is received, where the first message is generated by the terminal device according to the busy token.

In step 704, the first message is parsed according to the busy token.

In the example of the disclosure, the core network device may parse the first message according to the busy token, so as to determine whether the terminal device is in the busy state. The core network device may stop paging the terminal device when it is determined that the terminal device is in the busy state, so as to reduce resource occupation.

In a possible embodiment of the example of the disclosure, the core network device may use the busy token to perform integrity authentication on the first message. If the integrity authentication succeeds, it is determined that the terminal device is not in the busy state. In this case, the core network device may page the terminal device. If the integrity authentication fails, it is determined that the terminal device is in the busy state. In this case, in order to reduce resource occupation, the core network device may stop paging the terminal device.

In a possible embodiment of the example of the disclosure, the core network device may extract a first MAC from the first message. The first MAC is an MAC generated by the terminal device according to the busy token and the input parameters required for generating an MAC through the integrity algorithm, that is, an MAC generated by the terminal device by performing integrity protection on the message content, the count value, the bearer identifier, the transmission direction information and the busy token according to the integrity key. For instance, the first MAC may be an NAS-MAC in FIG. 5. Moreover, the core network device may obtain the input parameters required for generating an MAC, and then generate a second MAC according to the busy token and the input parameters required for generating an MAC. For instance, the second MAC may be the XNAS-MAC in FIG. 5, such that the core network device may determine a busy state of the terminal device according to a match between the first MAC and the second MAC.

Alternatively, in the case that the first MAC is consistent with the second MAC, the core network device may determine that the terminal device is in the busy state. In the case that the first MAC is inconsistent with the second MAC, the core network device may determine that the terminal device is not in the busy state.

In a possible embodiment of the example of the disclosure, the step of sending, by a core network device, a busy token to a terminal device via an access network device may include: generate, by the core network device, a second message, where the second message includes the busy token; and send, by the core network device, the second message to the terminal device via the access network device.

In a possible embodiment of the example of the disclosure, the second message is an NAS SMC message.

In a possible embodiment of the example of the disclosure, the core network device may perform integrity protection on the second message in order to prevent the second message from being tampered and guarantee the integrity of the second message. Correspondingly, after receiving the second message, the terminal device may perform integrity authentication on the second message.

In a possible embodiment of the example of the disclosure, the first message is an MAC of a non-access stratum (NAS) message or an MAC of a service request message.

It should be noted that an explanation of the paging method executed on the terminal device in any one of the foregoing examples in FIGS. 1-7 is also applicable to the paging method executed on the core network device in this example, and an implementation principle is similar, which will not be repeated here.

According to the paging method provided in the example of the disclosure, the terminal device generates the first message according to the busy token, and sends the first message to the core network device via the access network device, such that the core network device can be timely informed whether the terminal device is in a busy state according to the first message. Since it is unnecessary to carry a busy indication in a specific NAS message, there is no need to change an existing NAS message or bind the busy indication to the specific NAS message, and applicability and flexibility of the method can be improved.

It should be noted that the foregoing possible embodiments may be executed separately or may be executed in combination, which is not limited in the examples of the disclosure.

Corresponding to the paging method provided in the examples of FIGS. 1-7, the disclosure further provides a paging apparatus. Since the paging apparatus provided in the example of the disclosure corresponds to the paging method provided in the examples of FIGS. 1-7, embodiments of the paging method are also applicable to the paging apparatus provided in the example of the disclosure, which will not be described in detail in the examples of the disclosure.

Figure 12:
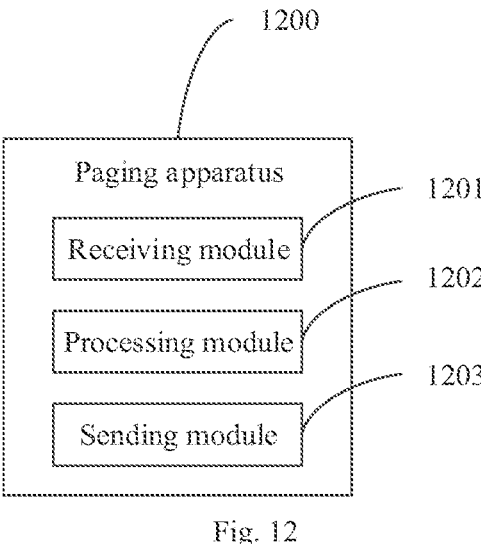
FIG. 12 is a schematic structural diagram of a paging apparatus according to an example of the disclosure.

FIG. 12 is a schematic structural diagram of another paging apparatus according to an example of the disclosure.

As shown in FIG. 12, the paging apparatus 1200 may include a receiving module 1201, a processing module 1202, and a sending module 1203.

The receiving module 1201 is configured to receive a busy token forwarded by an access network device, and receive a paging request from a non-currently-connected system forwarded by the access network device.

The processing module 1202 is configured to generate a first message according to the busy token.

The sending module 1203 is configured to send the first message to a core network device via the access network device. The paging apparatus 1200 has a first USIM and a second USIM, the paging apparatus 1200 communicates with a currently-connected system through the first USIM, and the paging apparatus 1200 communicates with a non-currently-connected system through the second USIM.

Alternatively, the processing module 1202 is specifically configured to obtain input parameters required for generating a message authentication code (MAC), and generate the first message according to the busy token and the input parameters required for generating an MAC.

Alternatively, the input parameters required for generating an MAC include message content, an integrity key, a count value, a bearer identifier, and transmission direction information.

Alternatively, the processing module 1202 is specifically configured to perform integrity protection on the message content, the count value, the bearer identifier, the transmission direction information, and the busy token according to the integrity key, and generate the first message.

Alternatively, the first message is an MAC of a non-access stratum (NAS) message or an MAC of a service request message.

Alternatively, the processing module 1202 is specifically configured to generate the first message according to the busy token and input parameters required for generating an MAC when the terminal device is in a busy state in the currently-connected system. Alternatively, the processing module 1202 is specifically configured to generate the first message according to the input parameters required for generating an MAC when the terminal device is not in a busy state in the currently-connected system.

Alternatively, the receiving module 1201 is specifically configured to receive a second message forwarded by the core network device via the access network device, where the second message includes the busy token.

Alternatively, the paging apparatus 1200 may further include an authentication module configured to perform integrity authentication on the second message by the terminal device.

Alternatively, the second message is a non-access stratum security mode command (NAS SMC) message.

According to the paging apparatus provided in the example of the disclosure, the terminal device generates the first message according to the busy token, and sends the first message to the core network device via the access network device, such that the core network device can be timely informed whether the terminal device is in a busy state according to the first message. Since it is unnecessary to carry a busy indication in a specific NAS message, there is no need to change an existing NAS message or bind the busy indication to the specific NAS message, and applicability and flexibility of the apparatus can be improved.

It should be noted that the foregoing possible embodiments may be executed separately or may be executed in combination, which is not limited in the examples of the disclosure.

Corresponding to the paging method provided in the example of FIG. 10, the disclosure further provides a paging apparatus. Since the paging apparatus provided in the example of the disclosure corresponds to the paging method provided in the example of FIG. 10, an embodiment of the paging method is also applicable to the paging apparatus provided in the example of the disclosure, which will not be described in detail in the example of the disclosure.

Figure 13:
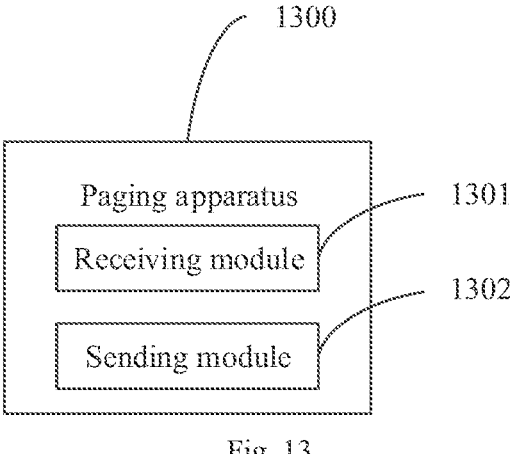
FIG. 13 is a schematic structural diagram of another paging apparatus according to an example of the disclosure.

FIG. 13 is a schematic structural diagram of another paging apparatus according to an example of the disclosure.

As shown in FIG. 13, the paging apparatus 1300 may include a receiving module 1301 and a sending module 1302.

The receiving module 1301 is configured to receive a busy token sent by a core network device.

The sending module 1302 is configured to forward the busy token to a terminal device.

The terminal device has a first USIM and a second USIM, the terminal device communicates with a currently-connected system through the first USIM, and the terminal device communicates with a non-currently-connected system through the second USIM.

The receiving module 1301 is further configured to receive a paging request from a non-currently-connected system sent by the core network device.

The sending module 1302 is further configured to forward the paging request from the non-currently-connected system to the terminal device.

The receiving module 1301 is further configured to receive a first message sent by the terminal device, where the first message is generated by the terminal device according to the busy token.

The sending module 1302 is further configured to forward the first message to the core network device.

Alternatively, the first message is an MAC of an NAS message or an MAC of a service request message.

Alternatively, the receiving module 1301 is specifically configured to receive a second message sent by the core network device, where the second message includes the busy token.

Alternatively, the second message is an NAS SMC message.

According to the paging apparatus provided in the example of the disclosure, the terminal device generates the first message according to the busy token, and sends the first message to the core network device via the access network device, such that the core network device can be timely informed whether the terminal device is in a busy state according to the first message. Since it is unnecessary to carry a busy indication in a specific NAS message, there is no need to change an existing NAS message or bind the busy indication to the specific NAS message, and applicability and flexibility of the apparatus can be improved.

It should be noted that the foregoing possible embodiments may be executed separately or may be executed in combination, which is not limited in the examples of the disclosure.

Corresponding to the paging method provided in the example of FIG. 11, the disclosure further provides a paging apparatus. Since the paging apparatus provided in the example of the disclosure corresponds to the paging method provided in the example of FIG. 11, an embodiment of the paging method is also applicable to the paging apparatus provided in the example of the disclosure, which will not be described in detail in the example of the disclosure.

Figure 14:
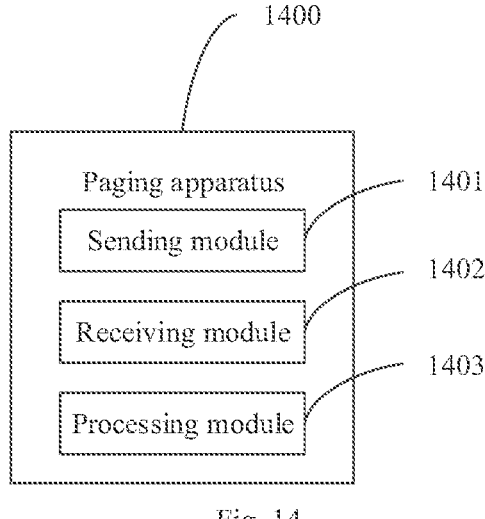
FIG. 14 is a schematic structural diagram of another paging apparatus according to an example of the disclosure.

FIG. 14 is a schematic structural diagram of another paging apparatus according to an example of the disclosure. The apparatus may be applied to a core network device.

As shown in FIG. 14, the paging apparatus 1400 may include a sending module 1401, a receiving module 1402, and a processing module 1403.

The sending module 1401 is configured to send a busy token to a terminal device via an access network device, and send a paging message to the terminal device via the access network device.

The receiving module 1402 is configured to receive a first message forwarded by the access network device, where the first message is generated by the terminal device according to the busy token.

The processing module 1403 is configured to parse the first message according to the busy token.

Alternatively, the sending module 1401 is specifically configured to generate a second message and send the second message to the terminal device by means of the access network device, where the second message includes the busy token.

Alternatively, the second message is an NAS SMC message.

Alternatively, the first message is an MAC of a non-access stratum (NAS) message or an MAC of a service request message.

Alternatively, the processing module 1403 is specifically configured to: extract a first MAC from the first message; obtain input parameters required for generating an MAC; generate a second MAC according to the busy token and the input parameters required for generating an MAC; and determine a busy state of the terminal device according to a match between the first MAC and the second MAC.

Alternatively, the input parameters required for an MAC include message content, an integrity key, a count value, a bearer identifier, and transmission direction information.

Alternatively, the processing module 1403 is specifically configured to determine that the terminal device is in the busy state when the first MAC is consistent with the second MAC; and alternatively, and determine that the terminal device is not in the busy state when the first MAC is inconsistent with the second MAC.

Alternatively, the processing module 1403 is specifically configured to: perform integrity authentication on the first message according to the busy token; determine that the terminal device is in a busy state if the integrity authentication succeeds; and alternatively, the processing module 1403 is specifically configured to determine that the terminal device is not in a busy state if the integrity authentication fails.

Alternatively, the paging apparatus 1400 may further include a stopping module configured to stop paging the terminal device when the core network device determines that the terminal device is in a busy state.

Alternatively, the paging apparatus 1400 may further include a protection module configured to perform integrity protection on the second message.

According to the paging apparatus provided in the example of the disclosure, the terminal device generates the first message according to the busy token, and sends the first message to the core network device via the access network device, such that the core network device can be timely informed whether the terminal device is in a busy state according to the first message. Since it is unnecessary to carry a busy indication in a specific NAS message, there is no need to change an existing NAS message or bind the busy indication to the specific NAS message, and applicability and flexibility of the apparatus can be improved.

In order to implement the above examples, the disclosure further provides a communication device.

The communication device provided in the example of the disclosure includes a processor, a transceiver, a memory, and an executable program stored on the memory and executable by the processor. The processor performs any one of the foregoing methods in FIGS. 1-7 when executing the executable program. The communication device may be the foregoing terminal device.

In order to implement the above examples, the disclosure further provides another communication device.

The communication device provided in the example of the disclosure includes a processor, a transceiver, a memory, and an executable program stored on the memory and executable by the processor. The processor performs the foregoing method in FIG. 10 when executing the executable program. The communication device may be the foregoing access network device.

In order to implement the above examples, the disclosure further provides another communication device.

The communication device provided in the example of the disclosure includes a processor, a transceiver, a memory, and an executable program stored on the memory and executable by the processor. The processor performs the foregoing method in FIG. 11 when executing the executable program. The communication device may be the foregoing core network device.

The processor may include various types of storage medium that are non-transitory computer storage media capable of continuing to memorize the information stored on the processor after the communication device is powered down. Here, the communication device includes a terminal device, an access network device, or a core network device.

The processor may be connected to the memory via a bus, and the like, for reading an executable program, for instance, at least one of FIGS. 1-11, stored in the memory.

In order to implement the above examples, the disclosure further provides another communication device.

The communication device provided in the example of the disclosure includes a processor and an interface circuit. The interface circuit is configured to receive a code instruction and transmit the code instruction to the processor. The processor is configured to execute the code instruction, to execute any one of the foregoing methods in FIGS. 1-7. The communication device may be the foregoing terminal device.

In order to implement the above examples, the disclosure further provides another communication device.

The communication device provided in the example of the disclosure includes a processor and an interface circuit. The interface circuit is configured to receive a code instruction and transmit the code instruction to the processor. The processor is configured to run the code instruction, to perform the foregoing method in FIG. 10. The communication device may be the foregoing access network device.

In order to implement the above examples, the disclosure further provides another communication device.

The communication device provided in the example of the disclosure includes a processor and an interface circuit. The interface circuit is configured to receive a code instruction and transmit the code instruction to the processor. The processor is configured to execute the code instruction, to execute the foregoing method in FIG. 11. The communication device may be the foregoing core network device.

In order to implement the above examples, the disclosure further provides a computer storage medium.

The computer storage medium provided in the example of the disclosure stores an executable program. The executable program, when being executed by a processor, may performs any one of the foregoing methods in FIGS. 1-7.

In order to implement the above examples, the disclosure further provides another computer storage medium.

The computer storage medium provided in the example of the disclosure stores an executable program. The executable program, when being executed by a processor, may perform the method in FIG. 10.

In order to implement the above examples, the disclosure further provides another computer storage medium.

The computer storage medium provided in the example of the disclosure stores an executable program. The executable program, when being executed by a processor, may implement the method in FIG. 11.

Figure 15:
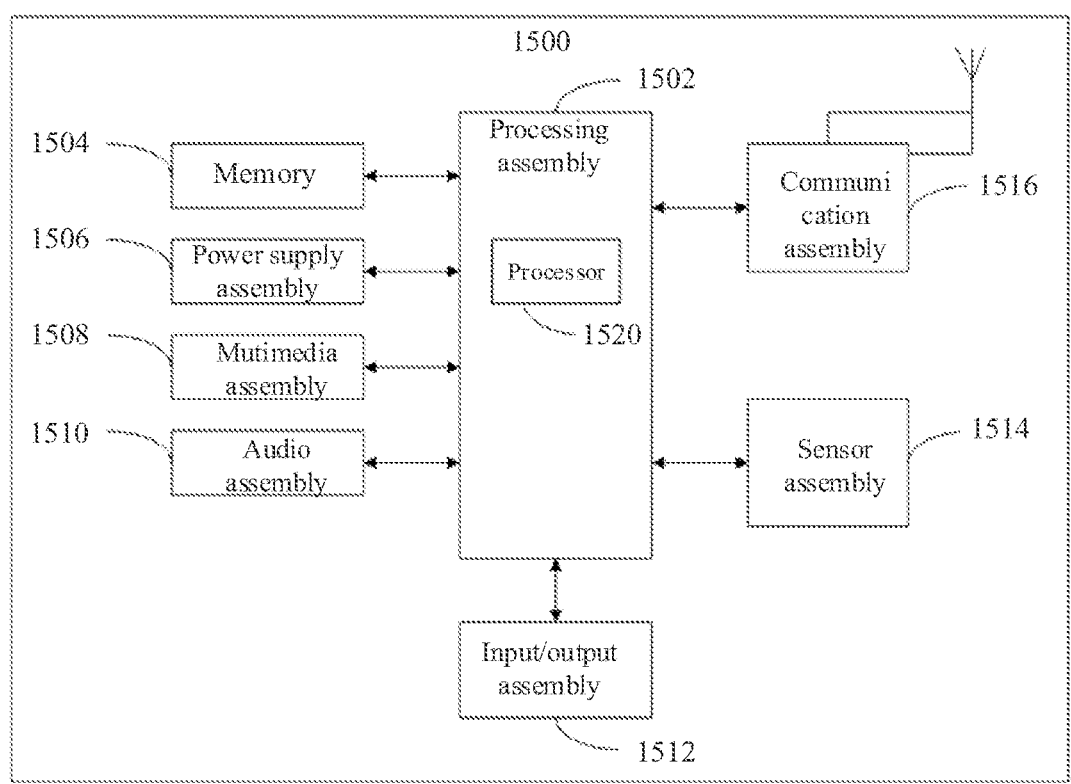
FIG. 15 is a block diagram of a terminal device according to an example of the disclosure. And, FIG. 16 is a schematic structural diagram of a network device according to an example of the disclosure.

FIG. 15 is a block diagram of a terminal device 1500 according to an example of the disclosure. For instance, the terminal device 1500 may be a mobile phone, a computer, digital broadcast user equipment, a messaging device, a gaming console, a tablet device, a medical device, a fitness device, a personal digital assistant, and the like.

With reference to FIG. 15, the terminal device 1500 may include at least one of a processing assembly 1502, a memory 1504, a power supply assembly 1506, a multimedia assembly 1508, an audio assembly 1510, an input/output (I/O) interface 1512, a sensor assembly 1514, and a communication assembly 1516.

The processing assembly 1502 generally controls an overall operation of the terminal device 1500, for instance, operations associated with display, phone calls, data communications, camera operations, and recording operations. The processing assembly 1502 may include at least one processor 1520 to execute an instruction, to complete all or part of the steps of the method above. Moreover, the processing assembly 1502 may include at least one module, to facilitate interaction between the processing assembly 1502 and other assemblies. For instance, the processing assembly 1502 may include the multimedia module, to facilitate interaction between the multimedia assembly 1508 and the processing assembly 1502.

The memory 1504 is configured to store various types of data to support operation on the terminal device 1500. Instances of such data include an instruction, operated on the terminal device 1500, for any application or method, contact data, phonebook data, messages, pictures, video, and the like. The memory 1504 may be implemented by any type of volatile or non-volatile memory device, or combination of them, for instance, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 1506 supplies power to various assemblies of the terminal device 1500. The power supply assembly 1506 may include a power management system, at least one power supply, and other assemblies associated with power generation, management, and distribution for the terminal device 1500.

The multimedia assembly 1508 includes a screen that provides an output interface between the terminal device 1500 and the user. In some examples, the screen may include a liquid crystal display (LCD) and a touch panel (TP). If the screen includes the touch panel, the screen may be implemented as a touch screen, to receive an input signal from the user. The touch panel includes at least one touch sensor to sense touches, slides, and gestures on the touch panel. The touch sensor may sense a boundary of a touch or swipe, and may also measure wake-up time and pressure associated with the touch or swipe. In some examples, the multimedia assembly 1508 includes a front-facing camera and/or a rear-facing camera. When the terminal device 1500 is in an operational mode, for instance, a photographing mode or a video mode, the front-facing camera and/or the rear-facing camera may receive external multimedia data. Each of the front-facing camera and the rear-facing camera may be a fixed optical lens system or have a focal length and optical zoom capability.

The audio assembly 1510 is configured to output and/or input audio signals. For instance, the audio assembly 1510 includes a microphone (MIC) configured to receive an external audio signal when the terminal device 1500 is in the operational mode, for instance, a calling mode, a recording mode, and a speech recognition mode. The received audio signal may be further stored in the memory 1504 or sent via the communication assembly 1516. In some examples, the audio assembly 1510 further includes a speaker to output an audio signal.

The I/O interface 1512 provides an interface between the processing assembly 1502 and a peripheral interface module. The peripheral interface module may be a keyboard, a click wheel, a button, and the like. These buttons may include, but are not limited to, a home button, a volume button, a start button, and a lock button.

The sensor assembly 1514 includes at least one sensor for providing state assessments of various aspects for the terminal device 1500. For instance, the sensor assembly 1514 may detect an on/off state of the terminal device 1500 and relative positioning of the assemblies. For instance, the assemblies are a display and a keypad of the terminal device 1500. The sensor assembly 1514 may also detect a change in position of the terminal device 1500 or an assembly of the terminal device 1500, the presence or absence of contact between the user and the terminal device 1500, orientation or acceleration/deceleration of the terminal device 1500, and temperature variation of the terminal device 1500. The sensor assembly 1514 may include a proximity sensor configured to detect the presence of a nearby object in the absence of any physical contact. The sensor assembly 1514 may also include a light sensor, for instance, a complementary metal oxide semiconductor (CMOS) or charge coupled device (CCD) image sensor, for use in imaging applications. In some examples, the sensor assembly 1514 may further include an acceleration sensor, a gyroscope sensor, a magnetic sensor, a pressure sensor or a temperature sensor.

The communication assembly 1516 is configured to facilitate communication between the terminal device 1500 and other devices in a wired or wireless mode. The terminal device 1500 may access a radio network based on a communication standard, for instance, WiFi, 2G, 3G, or combination of them. In an example, the communication assembly 1516 receives a broadcast signal or broadcast related information from an external broadcast management system via a broadcast channel. In an example, the communication assembly 1516 also includes a near field communication (NFC) module to facilitate short-range communication. For instance, the NFC module may be implemented based on a radio frequency identification (RFID) technology, an infrared data association (IrDA) technology, an ultra wide band (UWB) technology, a Bluetooth (BT) technology, and other technologies.

In an example, the terminal device 1500 may be implemented by at least one application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic elements to perform any one of the above paging methods of the examples in FIGS. 1-7.

In an example, a non-transitory computer-readable storage medium including an instruction is further provided, for instance, a memory 1504 including an instruction, and the instruction may be executed by the processor 1520 of the terminal device 1500, so as to perform the method above. For instance, the non-transitory computer-readable storage medium may be a read-only memory (ROM), a random access memory (RAM), a compact disc read-only memory (CD-ROM), a magnetic tape, a floppy disk, an optical data storage device, and the like.

Figure 16:
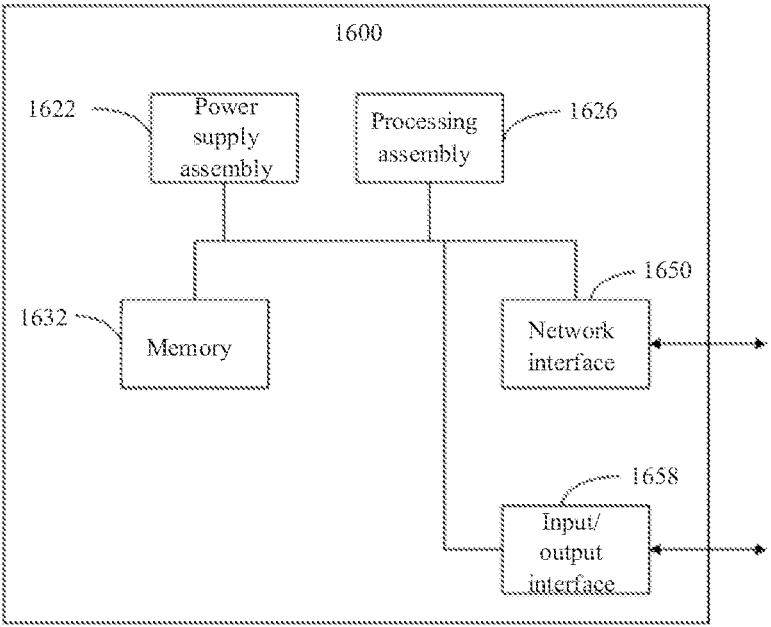

FIG. 16 is a schematic structural diagram of a terminal device according to an example of the present disclosure. The network device may be the access network device or the core network device in the above examples. With reference to FIG. 16, the network device 1600 includes a processing assembly 1622, and further includes at least one processor, and memory resources represented by a memory 1632 for storing an instruction executable by the processing assembly 1622, for instance, an application program. The application program stored in the memory 1632 may include one or more modules, each of which corresponds to a set of instructions. Moreover, the processing assembly 1622 is configured to execute an instruction, so as to perform any one of the methods described above applied to the access network device or the core network device, for instance, the paging method as shown in FIG. 10 or 11.

The network device 1600 may further include a power supply assembly 1626 configured to execute power supply management of the network device 1600, a wired or radio network interface 1650 configured to connect the network device 1600 to a network, and an input/output (I/O) interface 1658. The network device 1600 may operate an operating system stored in the memory 1632, for instance, Windows Server™, Mac OS X™, Unix™, Linux™, FreeBSD™, and the like.

Those skilled in the art can readily conceive of other embodiments of the disclosure upon consideration of the specification and practice of the disclosure. The disclosure is intended to cover any variations, uses, or adaptive changes of the disclosure, and these variations, uses, or adaptive changes follow general principles of the disclosure and include common general knowledge or customary technical means in the technical field not disclosed in the disclosure. The description and examples are considered as illustrative only, and a true scope and a spirit of the disclosure are indicated by the following claims.

It should be understood that the disclosure is not limited to a precise structure that has been described above and shown in the accompanying drawings, and that various modifications and changes may be made without departing from its scope. The scope of the disclosure is limited by the appended claims.

What is claimed is:

1. A paging method, comprising:
    receiving, by a terminal device, a busy token forwarded by an access network device;
    receiving, by the terminal device, a paging request from a non-currently-connected system forwarded by the access network device;
    generating, by the terminal device, a first message according to the busy token; and
    sending, by the terminal device, the first message to a core network device via the access network device; wherein the terminal device has a first universal subscriber identity module (USIM) and a second USIM, the terminal device communicates with a currently-connected system through the first USIM, and the terminal device communicates with the non-currently-connected system through the second USIM.

2. The paging method according to claim 1, wherein generating, by the terminal device, a first message according to the busy token comprises:
    obtaining, by the terminal device, input parameters required for generating a message authentication code (MAC); and
    generating, by the terminal device, the first message according to the busy token and the input parameters required for generating the MAC;
    wherein the input parameters required for generating the MAC comprise message content, an integrity key, a count value, a bearer identifier, and transmission direction information;
    wherein generating, by the terminal device, the first message according to the busy token and the input parameters required for generating the MAC comprises:
    performing, by the terminal device, integrity protection on the message content, the count value, the bearer identifier, the transmission direction information, and the busy token according to the integrity key, and generating the first message;
    wherein the first message is an MAC of a non-access stratum (NAS) message or an MAC of a service request message.

3. The paging method according to claim 2, wherein
    the terminal device is in a busy state in the currently-connected system, and the terminal device generates the first message according to the busy token and the input parameters required for generating an MAC; and alternatively,
    the terminal device is not in a busy state in the currently-connected system, and the terminal device generates the first message according to the input parameters required for generating the MAC.

4. The paging method according to claim 1, wherein receiving, by a terminal device, a busy token forwarded by an access network device comprises:
    receiving, by the terminal device, a second message forwarded by the core network device via the access network device,
    wherein the second message comprises the busy token;
    the paging method further comprises:
    performing, by the terminal device, integrity authentication on the second message, wherein the second message is a non-access stratum security mode command (NAS SMC) message.

5. A communication device, comprising: a transceiver, a memory, and a processor connected to the transceiver and the memory respectively, configured to control wireless signal transceiving of the transceiver by executing a computer-executable instruction on the memory, and capable of performing the paging method according to claim 1.

6. A paging method, comprising:
    receiving, by an access network device, a busy token sent by a core network device;
    forwarding, by the access network device, the busy token to a terminal device;
    receiving, by the access network device, a paging request from a non-currently-connected system sent by the core network device;
    forwarding, by the access network device, the paging request from the non-currently-connected system to the terminal device;

receiving, by the access network device, a first message sent by the terminal device, wherein the first message is generated by the terminal device according to the busy token; and forwarding, by the access network device, the first message to the core network device.

7. The paging method according to claim 6, wherein the first message is a message authentication code (MAC) of an NAS message or an MAC of a service request message.

8. The paging method according to claim 6, wherein receiving, by an access network device, a busy token sent by a core network device comprises:

receiving, by the access network device, a second message sent by the core network device, wherein the second message comprises the busy token, wherein the second message is an NAS SMC message.

9. A communication device, comprising: a transceiver, a memory, and a processor connected to the transceiver and the memory respectively, configured to control wireless signal transceiving of the transceiver by executing a computer-executable instruction on the memory, and capable of performing the paging method according to claim 6.

10. A paging method, comprising:

sending, by a core network device, a busy token to a terminal device via an access network device;

sending, by the core network device, a paging message to the terminal device via the access network device;

receiving, by the core network device, a first message forwarded by the access network device, wherein the first message is generated by the terminal device according to the busy token; and parsing, by the core network device, the first message according to the busy token.

11. The paging method according to claim 10, wherein sending, by a core network device, a busy token to a terminal device via an access network device comprises:

generating, by the core network device, a second message, wherein the second message comprises the busy token; and sending, by the core network device, the second message to the terminal device via the access network device.

12. The paging method according to claim 11, wherein the second message is an NAS SMC message.

13. The paging method according to claim 11, further comprising:

performing, by the core network device, integrity protection on the second message.

14. The paging method according to claim 10, wherein the first message is an MAC of a non-access stratum (NAS) message or an MAC of a service request message.

15. The paging method according to claim 10, wherein parsing, by the core network device, the first message according to the busy token comprises:

extracting, by the core network device, a first MAC from the first message;

obtaining, by the core network device, input parameters required for generating an MAC;

generating, by the core network device, a second MAC according to the busy token and the input parameters required for generating the MAC; and determining, by the core network device, a busy state of the terminal device according to a match between the first MAC and the second MAC.

16. The paging method according to claim 15, wherein the input parameters required for the MAC comprise message content, an integrity key, a count value, a bearer identifier, and transmission direction information.

17. The paging method according to claim 15, wherein the first MAC is consistent with the second MAC, and the core network device determines that the terminal device is in the busy state; and alternatively, the first MAC is inconsistent with the second MAC, and the core network device determines that the terminal device is not in the busy state.

18. The paging method according to claim 10, wherein parsing, by the core network device, the first message according to the busy token comprises:

performing, by the core network device, integrity authentication on the first message according to the busy token;

wherein the integrity authentication succeeds, and the core network device determines that the terminal device is in a busy state; and alternatively, the integrity authentication fails, and the core network device determines that the terminal device is not in a busy state.

19. The paging method according to claim 10, wherein the core network device determines that the terminal device is in a busy state, and the core network device stops paging the terminal device.

20. A communication device, comprising: a transceiver, a memory, and a processor connected to the transceiver and the memory respectively, configured to control wireless signal transceiving of the transceiver by executing a computer-executable instruction on the memory, and capable of performing the paging method according to claim 10.

* * * * *